United States Patent

Dobbs et al.

[15] 3,700,067
[45] Oct. 24, 1972

[54] ACOUSTIC FACE SHEET

[72] Inventors: Richard A. Dobbs, Orange; Richard N. Holmes, Glendale, both of Calif.

[73] Assignee: McDonnell Douglas Corporation

[22] Filed: June 1, 1970

[21] Appl. No.: 41,897

[52] U.S. Cl. ...................... 181/33 G, 181/33 H
[51] Int. Cl. .................... G10k 11/00, F01n 7/00
[58] Field of Search .... 181/33 R, 33 H, 33 G, 33 GA, 181/33 GB, 50; 139/408–415

[56] References Cited

UNITED STATES PATENTS

| | | |
|---|---|---|
| 3,502,171 | 3/1970 | Cowan ...................... 181/33 R |
| 3,481,427 | 12/1969 | Dobbs et al. ............. 181/33 R |
| 2,934,097 | 4/1960 | Hindle et al. .......... 139/408 X |

*Primary Examiner*—Richard B. Wilkinson
*Assistant Examiner*—John F. Gonzales
*Attorney*—Walter J. Jason, Donald L. Royer and Robert O. Richardson

[57] ABSTRACT

A three-dimensional acoustic porous face sheet formed from an integrally woven fabric and made rigid in a desired configuration by a resin system.

2 Claims, 7 Drawing Figures

INVENTORS
RICHARD N. HOLMES
RICHARD A. DOBBS
BY Robert O. Richardson
-ATTORNEY-

ACOUSTIC FACE SHEET

RELATED INVENTIONS

The present invention is an advancement over applicants' prior patent entitled "Acoustical Panel Structure," U.S. Pat. No. 3,481,427, which issued Dec. 2, 1969.

BACKGROUND OF THE INVENTION

Sound suppression is very desirable in many instances. Various techniques are used in the suppression of sound, where the noise originates, at the medium through which the sound waves propagate, and in the immediate vicinity of the listener where such environment is a distraction and annoyance. The invention disclosed in the earlier patent referred to above relates to the suppression of noise having, as an example, the noise from an aircraft engine and dealt with a three-dimensional panel having an integrally woven upper face, a rib core structure, and a back face. The upper face consisted of high twist crossed fibers to provide openings for the passage of air and sound waves therethrough.

There are some situations wherein the weaving of a three-dimensional panel is less preferable to the structure of the present invention wherein a three-dimensional acoustic porous face sheet is formed for use over sound suppression structure of other configurations.

SUMMARY OF THE PRESENT INVENTION

A three-dimensional acoustic porous face sheet is formed from an integrally woven fabric made rigid in a desired configuration by a resin system. This face is porous, having openings through which wave energy passes as sound waves propagate over its surface. This three-dimensional acoustic face sheet is bonded, mechanically attached or laid over a plurality of cavities or absorbent materials or may be used singly as an acoustic absorber. In weaving the three-dimensional face, fibers are woven using techniques known in the art and referred to in the above-mentioned patent. However, special face weave designs and resin systems are required to give optimum noise reduction. In converting the woven fabric to a rigid state, the fabric is passed through a resin solution in a technique shown in the art as impregnation and wherein the amount of resin remaining on the fibers is controlled. Thereafter, the porous three-dimensional acoustic face is cured and made rigid on a call plate or shape-formed molding tool under vacuum bag pressure or in an autoclave.

BRIEF DESCRIPTION OF THE DRAWINGS

FIG. 1 is a perspective view showing the face sheet and back panel with a honeycomb material in between;

FIG. 2 is a perspective view showing the face sheet, back panel and a plurality of spacer beams sandwiched in between;

FIG. 3 is a perspective view showing the face sheet over a porous batting; while

DETAILED DESCRIPTION OF ILLUSTRATIVE EMBODIMENTS

Figure 1:
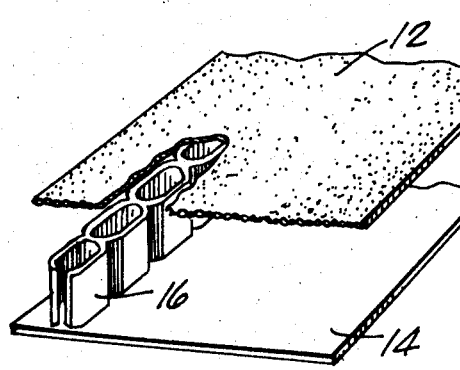

Reference is now made to the honeycomb panel structure 10 in FIG. 1 wherein there is shown a porous face sheet 12 and impervious back panel 14 interconnected by ribs 16 of honeycomb material. A plurality of tubular members, or a lattice or egg crate structure known in the art, also may be used to provide the stiffening rib sections between the face sheets. These panels normally provide a high strength-to-weight ratio but have not heretofore been used in sound suppression. With the exception of the use of a porous face sheet 12, such panels are well known and widely used in aircraft and building construction. The face sheet 12 is built in accordance with the techniques set forth in applicants' earlier patent and the honeycomb ribs 16 are bonded to the face sheet and back panel in a conventional manner. Further description of the face sheet 12 will be made hereinafter.

Figure 2:
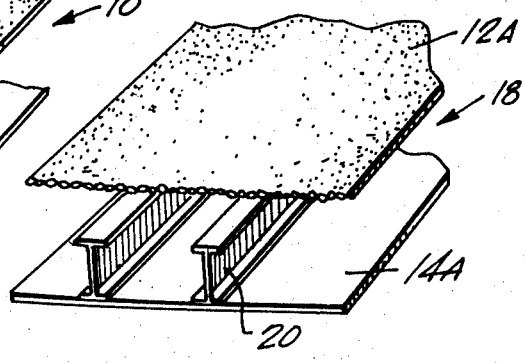
Figure 3:
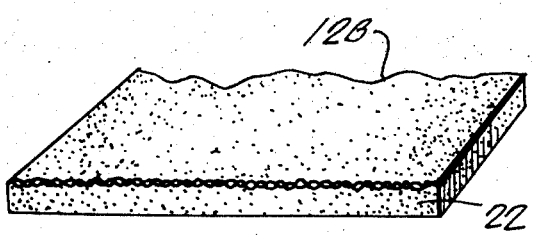

A wall and beam panel structure 18 is shown in FIG. 2. In this case, spacer I-beams 20 extend parallel to each other and are spaced apart to provide channel cavities therebetween. Face sheet 12A and back panel 14A may be similar to those shown in FIG. 1. In FIG. 3 the face sheet 12B is secured to the surface of a porous batting material 22, such as fiberglas insulation, for example.

In the three embodiments shown in FIGS. 1, 2 and 3, as well as other embodiments that will occur to those skilled in the art, the face sheets, in use, are placed to be exposed to the sound waves and the back panels and porous batting faces the object to be protected from the noise. These panels may be used to surround the noise source, they may be positioned near the object to be protected from the noise, or at any intermediate position in between. They may be rigidized in plane form and used as wall partitions in a building, for example, or they may be curved and shaped to suit specific needs.

Various configurations of weaving in the fabrication of the face sheet 12 are shown in the illustrative embodiments in FIGS. 4, 5, 6 and 7.

Figure 4:
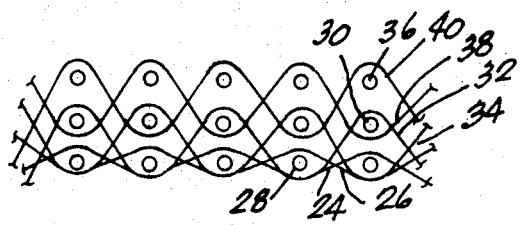
FIGS. 4, 5, 6 and 7 are schematic illustrations of alternate forms of weaving.

The weave pattern shown in FIG. 4 is a conventional weave in the art of making a three-dimensional fabric. The size, twist, spacing and other criteria may be as set forth in applicants' prior patent. In this pattern, warp yarns 24 and 26 extend alternatively over and under the fill yarns 28 which are the bottom layer fill yarns. A second layer of fill yarns 30 are interconnected with the fill yarns 28 on the lower layer by warp yarns 32 and 34. The third layer of fill yarns 36 are connected to the middle layer 30 by warp yarns 38 and 40. In this manner, any number of layers of fill yarns may be used with the warp yarns interwoven such that the face sheet thus formed constitutes an integrally formed three-dimensional face sheet. The porosity of the face sheet may be controlled by designating a desired number of picks per inch of the fill yarns.

Figure 5:
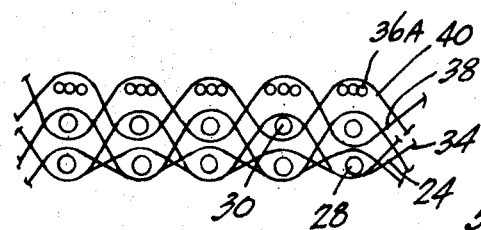

The configuration shown in FIG. 5 is quite similar to that in FIG. 4 except that three small fill yarns 36A, on the outer surface, replace the single fill yarn 36 in FIG. 4. This provides a smoother finish on the outer surface which is of advantage when it is used as a building wall covering, for example.

Figure 6:
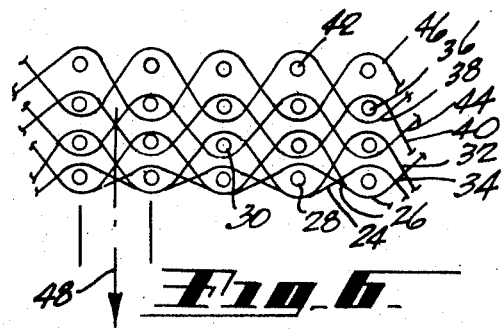

A perforated plate configuration is shown in FIG. 6. Here, by way of example, are four layers 28, 30, 36 and 42 of fill yarns interwoven by warp yarns similar in manner to that shown in FIGS. 4 and 5. Warp yarns 24, 26 bind lower layer fill yarns 28 together, warp yarns 32, 34 bind layers 28 and 30 of fill yarns together, warp yarns 40, 44 bind layers 30 and 36 of fill yarns together, and warp yarns 38, 46 bind layers 36 and 42 of fill yarns together. It should be understood that while the fill yarns are shown in section as being in planar form, the fill yarns also may be interlaced vertically, if desired. Care is taken that the weave pattern places the fill yarns in alignment normal to the surface of the face sheet and that the aligned rows are spaced to provide acoustical cavities, permitting sound wave passage with sound attenuation. In contrast to the configuration hereinafter described and shown in FIG. 7, this configuration more sharply tunes the acoustical suppression to defined frequencies and is preferable when a specific noise source and its range of frequency can be determined.

Figure 7:
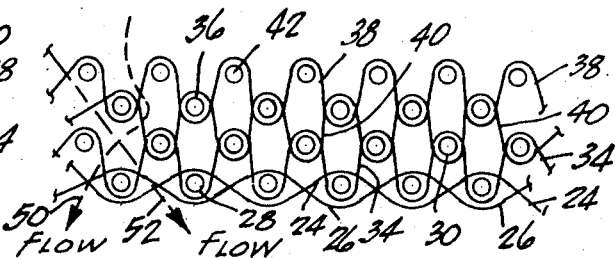

The tortuous path concept shown in FIG. 7 provides lower flow linearity than the perforated plate configuration in FIG. 6. In FIG. 7 alternate layers 28, 36 of fill yarns are out of vertical alignment with fill yarn alternate layers 30, 42. Instead of a straight through flow path as shown by arrow 48 in FIG. 6, the flow paths in FIG. 7 are shown by arrows 50 and 52.

Having thus described the preferred embodiment of the present invention, it is to be understood that modifications and variations therefrom will readily occur to one skilled in the art, and it is to be understood that these deviations are to be considered as part of the present invention as set forth in the appended claims.

We claim:

1. A three-dimensional integral woven porous acoustic face sheet comprising fibers interwoven in layers of fill yarns interlaced with warp yarns and impregnated with a resin system to form a porous rigid face sheet, said fill yarns of adjacent layers being out of alignment normal to the surface of said face sheet to provide tortuous flow paths therethrough.

2. A three dimensional integral woven porous acoustic face sheet as set forth in claim 1, an impervious back panel, and ribs interconnecting said face sheet and said back panel to form a sound suppression. panel.

* * * * *